United States Patent
Takahashi et al.

(10) Patent No.: US 6,362,245 B1
(45) Date of Patent: Mar. 26, 2002

(54) POROUS CO-POLYMER PARTICLES, PROCESS FOR PREPARING THE SAME AND USE OF THE SAME

(75) Inventors: Ryuji Takahashi, Kanagawa; Hiroshi Suzuki, Tokyo; Kuniaki Shimbo, Kanagawa, all of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,406

(22) Filed: Oct. 4, 1999

Related U.S. Application Data
(60) Provisional application No. 60/149,899, filed on Aug. 23, 1999.

(30) Foreign Application Priority Data

Oct. 2, 1998 (JP) ............................................ 10-281651

(51) Int. Cl.$^7$ ................................................ C08F 36/20
(52) U.S. Cl. .................. 521/149; 521/150; 521/56; 521/60; 95/88
(58) Field of Search .......................... 521/25, 38, 56, 521/53, 142, 187, 149, 150; 95/88

(56) References Cited

U.S. PATENT DOCUMENTS

| | | | | |
|---|---|---|---|---|
| 4,576,973 A | * | 3/1986 | Keil et al. ................... | 521/149 |
| 4,873,299 A | | 10/1989 | Nowakowsky et al. | |
| 4,968,806 A | * | 11/1990 | McQuigg et al. ........... | 546/304 |
| 5,658,800 A | * | 8/1997 | Lessard et al. .............. | 436/178 |
| 5,882,521 A | | 3/1999 | Bouvier et al. | |

FOREIGN PATENT DOCUMENTS

| | | |
|---|---|---|
| DE | 196 594 | 3/1998 |
| DE | 196 38 594 A | 3/1998 |
| EP | 0 473 881 A | 3/1991 |
| EP | 473 881 | 3/1992 |
| EP | 0 510 246 A | 10/1992 |
| EP | 585 898 | 3/1994 |
| EP | 0 585 898 A | 3/1994 |
| EP | 859 015 | 8/1998 |
| EP | 0 859 015 A2 | 8/1998 |
| EP | 0 859 015 A3 | 8/1998 |

OTHER PUBLICATIONS

Patent Abstracts of Japan, JP 10–036615, Feb. 10, 1998.
Patent Abstracts of Japan, JP 6–126195, May 10, 1994.
Patent Abstracts of Japan, JP 9–110702, Apr. 28, 1997.
Patent Abstracts of Japan, JP 9–31114, Feb. 4, 1997.
Chemical Abstracts, vol. 128, No. 13, Mar. 1998, Hamimoto et al.
Chemical Abstracts, vol. 121, No. 20 Nov. 1994, Ito et al.
Chemical Abstracts, vol. 127, No. 3, Jul. 1997, Ishii et al.

\* cited by examiner

*Primary Examiner*—James J. Seidleck
*Assistant Examiner*—Melanie Bagwell-Bissett
(74) *Attorney, Agent, or Firm*—Sughrue Mion, PLLC

(57) ABSTRACT

A porous copolymer particle having a particle size of from 0.1 to 2,000 $\mu$m and a permanent pore size of from 2 to 800 nm comprising (i) a monomer containing from 5 to 60 wt % of a monomer (A) selected from N-vinylcarboxylic acid amides represented by formula (I):

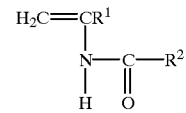

(I)

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 40 to 95 wt % of a copolymerizable monomer (B) which contains a crosslinking monomer.

23 Claims, No Drawings

POROUS CO-POLYMER PARTICLES, PROCESS FOR PREPARING THE SAME AND USE OF THE SAME

CROSS REFERENCE TO RELATED APPLICATIONS

This application is an application filed under 35 U.S.C. §111(a) claiming benefit pursuant to 35 U.S.C. §119(e)(i) of the filing date of the Provisional Application No. 60/149,899 filed Aug. 23, 1999 pursuant to 35 U.S.C. §111(b).

FIELD OF THE INVENTION

The present invention relates to a porous copolymer particle containing a structural unit derived from an N-vinylcarboxylic acid amide and another monomer, and also relates to a preparation process thereof, and also use thereof.

BACKGROUND OF THE INVENTION

An N-vinylcarboxylic acid amide (hereinafter sometimes referred to as "monomer (A)") has high hydrophilicity, therefore, use of a copolymer of the N-vinylcarboxylic acid amide and another monomer copolymerizable therewith (hereinafter sometimes referred to as "monomer (B)") as a hydrophilic gel has been proposed (see, for example, JP-A-4-323213 (the term "JP-A" as used herein means an "unexamined published Japanese patent application")). By increasing the ratio of the monomer (A), the hydrophilicity is elevated. The hydrophilic gel allowed to hold a large amount of water is used as a thickener, a dispersion stabilizer, a lubricant or the like. However, use as a porous particle, for example, as a packing material for chromatography, is not described.

With respect to the production process of the above-described copolymer particle, a reversed phase emulsion polymerization method is disclosed, for example, in JP-A-63-90513. However, polymer particles obtained by this method are dispersed in a cracking solvent, the dispersion in the hydrated state is dissolved as it is in water in the presence of a surface active agent for inversion, and the aqueous solution obtained is used as a coagulating agent, for recovery of petroleum or the like. Thus, this is not suitable for use as a polymer particle.

JP-A-61-141712 discloses a method for obtaining a particulate polymer by dispersing an aqueous monomer solution in a hydrocarbon-type dispersion medium using an oil-soluble polymer dispersion stabilizer such as ethyl cellulose and subjecting the monomer to reversed phase suspension polymerization. However, in this method, the object is also to obtain a water-soluble polymer and use of the polymer in the particulate state is not described. Moreover, this method has a problem in the treatment of the hydrocarbon dispersion medium generated in a large amount after the polymerization.

JP-A-6-122725 discloses a dispersion polymerization method of polymerizing a monomer in a solvent which dissolves the monomer but does not dissolve the copolymer produced, in the presence of a polymer dispersant. The polymer produced by this method is not porous and the polymer particle obtained has a small particle size of around 1 μm, therefore, the polymer particle cannot be used for general purposes.

SUMMARY OF THE INVENTION

An object of the present invention is to obtain a porous copolymer particle having both hydrophilic properties and hydrophobic properties, thereby exhibiting composite performance, being porous, and having excellent mechanical strength. The particle is suitable for use in the particulate state and usable for general purposes. An object also is to provide an absorbent or packing material comprising the porous copolymer particle. A packing material may be used for solid phase extraction and chromatography. An object also is to provide an efficient preparation process thereof.

The present invention provides a porous copolymer particle, a preparation process thereof and a use thereof described below:

(1) A porous copolymer particle comprising a particle of a copolymer comprising (i) from 5 to 60 wt % of a structural unit derived from a monomer (A) selected from N-vinylcarboxylic acid amide represented by formula (I):

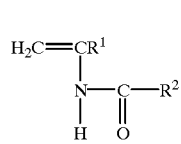

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B) which contains a crosslinking monomer, or a particle of a modified product of the copolymer, and the particle having a particle size of from 0.1 to 2,000 μm.

(2) The porous copolymer particle as described in (1) above, wherein the copolymer comprises (i) from 5 to 60 wt % of the structural unit derived from the monomer (A) and (ii) from 40 to 95 wt % of the structural unit derived from the monomer (B).

(3) The porous copolymer particle as described in (1) or (2) above, wherein $R^2$ in formula (I) represents a hydrogen atom, a methyl group or an ethyl group.

(4) The porous copolymer particle as described in (1) or (2) above, wherein the monomer (A) is N-vinylacetamide.

(5) The porous copolymer particle as described in any one of (1) to (4) above, wherein the particle size is from 1 to 500 μm.

(6) The porous copolymer particle as described in (1) or (2) above, wherein the copolymer particle has a permanent pore having a pore size of from 2 to 800 nm.

(7) The porous copolymer particle as described in (3) above, wherein the copolymer particle has a permanent pore having a pore size of from 2 to 800 nm.

(8) The porous copolymer particle as described in (4) above, wherein the copolymer particle has a permanent pore having a pore size of from 2 to 800 nm.

(9) The porous copolymer particle as described in any one of (1) to (8) above, wherein the copolymer particle has a permanent pore having a pore size of from 2 to 100 nm.

(10) The porous copolymer particle as described in any one of (1) to (9) above, wherein 50 wt % or more of the monomer (B) is a crosslinking monomer.

(11) A process for producing a porous copolymer particle comprising dissolving a monomer containing (i) from 5 to 60 wt % of a structural unit derived from a monomer (A) selected from N-vinylcarboxylic acid amide represented by formula (I):

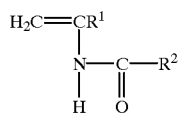

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 40 to 95 wt % of a structural unit derived from a copolymerizable monomer (B) which contains a crosslinking monomer, in a diluent in which these monomers are soluble but in which the polymer produced is not soluble;

suspending the resulting monomer solution in an aqueous medium containing a dispersion stabilizer;

polymerizing the monomers in the presence of a polymerization initiator; and if desired, modifying the copolymer obtained.

(12) The process as described in (11) above, wherein $R^2$ in formula (I) represents a hydrogen atom, a methyl group or an ethyl group.

(13) The process as described in (11) above, wherein the monomer (A) is N-vinylacetamide.

(14) The process as described in (11) above, wherein 50 wt % or more of the monomer (B) is a crosslinking monomer.

(15) The process as described in (12) above, wherein 50 wt % or more of the monomer (B) is a crosslinking monomer.

(16) The process as described in (13) above, wherein 50 wt % or more of the monomer (B) is a crosslinking monomer.

(17) The process as described in any one of (11) to (14) above, wherein the aqueous medium contains a salt.

(18) The process as described in (15) above, wherein the aqueous medium contains a salt.

(19) The process as described in (16) above, wherein the aqueous medium contains a salt.

(20) An absorbent comprising a porous copolymer particle comprising a particle of a copolymer comprising (i) from 5 to 60 wt % of a structural unit derived from a monomer (A) selected from N-vinylcarboxylic acid amide represented by formula (I):

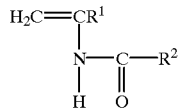

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B) which contains a crosslinking monomer, or a particle of a modified product of the copolymer, and the particle having a particle size of from 0.1 to 2,000 μm.

(21) The absorbent as described in (20) above, wherein $R^2$ in formula (I) represents a hydrogen atom, a methyl group or an ethyl group.

(22) The absorbent as described in (20) above, wherein the monomer (A) is N-vinylacetamide.

(23) A packing material for the solid phase extraction or chromatography, comprising a porous copolymer particle comprising a particle of a copolymer comprising (i) from 5 to 60 wt % of a structural unit derived from a monomer (A) selected from N-vinylcarboxylic acid amide represented by formula (I):

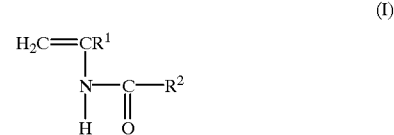

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B) which contains a crosslinking monomer, or a particle of a modified product of the copolymer, and the particle having a particle size of from 0.1 to 2,000 μm.

(24) The packing material as described in (23) above, wherein $R^2$ in formula (I) represents a hydrogen atom, a methyl group or an ethyl group.

(25) The packing material as described in (23) above, wherein the monomer (A) is N-vinylacetamide.

(26) A solid phase extraction cartridge containing a porous copolymer particle comprising a particle of a copolymer comprising (i) from 5 to 60 wt % of a structural unit derived from a monomer (A) selected from N-vinylcarboxylic acid amide represented by formula (I):

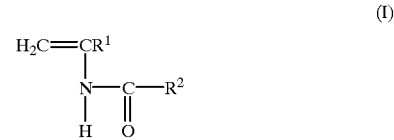

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B) which contains a crosslinking monomer, or a particle of a modified product of the copolymer, and the particle having a particle size of from 0.1 to 2,000 μm.

(27) An open-ended container for chromatography in which is packed by a porous copolymer particle comprising a particle of a copolymer comprising (i) from 5 to 60 wt % of a structural unit derived from a monomer (A) selected from N-vinylcarboxylic acid amide represented by formula (I):

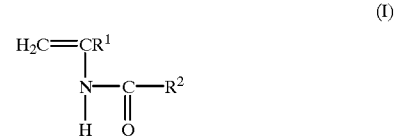

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B)

which contains a crosslinking monomer, or a particle of a modified product of the copolymer,
and wherein the particle size is from 0.1 to 2,000 μm, if desired, together with a binder.

DESCRIPTION OF THE PREFERRED EMBODIMENTS

The monomer (A) is an N-vinylcarboxylic acid amide represented by formula (I). Specific examples thereof includes N-vinylformamide, N-vinylacetamide, N-vinylpropinamide, N-(2-propenyl)formamide, N-(2-propenyl)acetamide, N-vinylbutyramide, N-vinylhexanamide, N-vinylbenzamide, N-vinyl-(p-toluamide), N-vinyl-(o-toluamide) or the like. Examples of the suitable monomers include N-vinylformamide, N-vinylacetamide, N-vinylpropionamide, N-(2-propenyl) formamide and N-(2-propenyl)acetamide. Among these, those where $R^1$ is a hydrogen atom are preferred, and N-vinylacetamide is more preferred in view of stability and hydrophilic property of the copolymer obtained.

The monomer (B) is copolymerizable with the monomer (A) or the monomers (B) are copolymerizable with each other. The monomer (B) contains a crosslinking monomer having two or more polymerizable unsaturated groups and may optionally contain a non-crosslinking monomer having one polymerizable unsaturated group. In the monomer (B), the crosslinking monomer preferably accounts for 50 wt % or more, with the remaining being a non-crosslinking monomer. The monomers (B) are preferably hydrophobic but may partially contain a hydrophilic monomer. In the case where a hydrophilic monomer is present, the proportion thereof in the monomer (B) is preferably 50 wt % or less, more preferably 20 wt % or less.

The crosslinking monomer in the monomer (B) is not particularly limited as long as it copolymerizes with other monomer used or preferably an N-vinylcarboxylic acid amide represented by formula (I). Specific examples thereof include di(meth)acrylic acid esters of a (poly)alkylene glycol such as ethylene glycol di(meth)acrylate, diethylene glycol di(meth)acrylate, triethylene glycol di(meth)acrylate, polyethylene glycol di(meth)acrylate, propylene glycol di(meth)acrylate and polypropylene glycol di(meth)acrylate; poly(meth)acrylic acid esters of a polyhydric alcohol, such as glycerin di(meth)acrylate, trimethylolpropane tri(meth)acrylate, tetramethylolmethane tri(meth)acrylate and tetramethylolmethane tetra(meth)acrylate; and aromatic compounds having two or more vinyl groups, such as divinylbenzene, divinyltoluene, divinylxylene and divinylnaphthalene. Specific examples of the crosslinking monomer in the monomer (B) furthermore includes divinyl ether other than aromatic compounds such as diallyl ether, trimethylolpropanediallyl ether, pentaerythritoltriallyl ether, tetraallyloxyethane; and N,N'-lower alkylenebis(N-vinylcarboxylic acid amide) such as N,N'-methylenrbis(N-vinylacetamide), N,N'-1,3-propylenebis(N-vinylacetamide). In the present invention, "(meth)acry-" means "acry-" or "methacry-".

Among the above, in view of strength of the copolymer obtained, particularly preferable are aromatic compounds having two or more of vinyl groups, di(meth)acrylic acid esters of ethylene glycol, di(meth)acrylic acid esters of polyhydric alcohol or the like. In a preferred example, the crosslinking monomer is divinylbenzene, ethylene glycol dimethacrylate, glycerin dimethacrylate or the like.

The non-crosslinking monomer is not particularly limited as long as it copolymerizes with other monomer used or preferably an N-vinylcarboxylic acid amide represented by formula (I). Specific examples thereof include styrene-type monomers such as styrene, methylstyrene, chlorostyrene and chloromethylstyrene; vinyl carboxylate-type monomers such as vinyl acetate and vinyl propionate; (meth)acrylic acid ester-type monomers such as methyl (meth)acrylate, ethyl (meth)acrylate, propyl (meth)acrylate, glycidyl (meth)acrylate, 2-hydroxyethyl (meth)acrylate, 2-hydroxypropyl (meth)acrylate, glycerol mono(meth)acrylate and polyethylene glycol (meth)acrylate; maleic acid ester-type monomers such as maleic acid, maleic anhydride, 2,3-dimethylmaleic anhydride, dimethyl maleate and diethyl maleate; monomers having a carboxyl group, such as (meth)acrylic acid and crotonic acid; vinyl ether-type monomers such as methyl vinyl ether, ethyl vinyl ether, propel vinyl ether and butyl vinyl ether; and other nonionic monomers such as acrylonitrile.

In a preferred example, the non-crosslinking monomer of the monomer (B) is chloromethylstyrene, glycidyl methacrylate, 2-hydroxyethyl methacrylateor or the like. If these monomers are used, it may be possible to introduce a functional group into a copolymer so that the copolymer may be obtained applicable for broad fields.

For the monomer (B), a crosslinking monomer and the balance of a non-crosslinking monomer are used. The crosslinking monomer preferably accounts for 50 wt % or more, namely, from 50 wt % to 100 wt % of the monomer (B), however, the ratio between the crosslinking monomer and the non-crosslinking monomer varies depending on the required properties of the objective copolymer particle. For example, when the particle is used in an aqueous medium, like a packing material for liquid chromatography or an ion exchange resin, the crosslinking monomer is used alone or in a larger amount so as to reduce the water solubility and increase the strength. In the case where the particle is used in a gas, like a gas treating agent, and water solubility is not a matter of concern, the crosslinking monomer may be used in a small amount. Even when the non-crosslinking monomer is used in a small amount, the particle tends to become water-insoluble with use of a large amount of hydrophobic monomer, and become water-soluble with use of a small amount of hydrophobic monomer.

As such, the ratio of the hydrophobic monomer to the hydrophilic monomer (for example, glycerin di(meth) acrylate, glycerin mono(meth)acrylate, 2-hydroxyethyl (meth)acrylate, (meth)acrylic acid or the like) in the monomer (B), the ratio of the crosslinking monomer to the non-crosslinking monomer, and the ratio of the monomer (A) to the monomer (B) may be selected depending on the properties desired in the copolymer particle. In general, the monomer (A) content is from 5 to 60 wt %, preferably from 10 to 40 wt % and the monomer (B) content is from 40 to 95 wt %, preferably from 60 to 90 wt %, when total content of the monomer (A) and the monomer (B) is 100 wt %.

In the case where a plurality of monomers is used for the monomer (A) by selecting $R^1$ and $R^2$, the monomers may be used in an arbitrary ratio. Also, in the case where a crosslinking monomer and a non-crosslinking monomer are used for the monomer (B), these monomers may be used at an arbitrary ratio depending on the properties desired in the copolymer particle. Furthermore, in the case where a plurality of crosslinking monomers or a plurality of non-crosslinking monomers are used for the monomer (B), the crosslinking monomers or the non-crosslinking monomers may be used at an arbitrary ratio. When such a plurality of monomers are used, it is not necessary that all monomers have a relationship that monomer (A) and monomer (B) are copolymerized, but it may suffice if a copolymer is produced as a whole.

The copolymer particle of the present invention is a copolymer having structural units derived from these monomers, or a modified product of the copolymer. The copolymer particle is a porous particle having a particle size of from 0.1 to 2,000 µm, preferably from 3 to 500 µm (more preferably from 5 to 100 µm). The particle shape is preferably spherical, however, amorphous or other shapes may also be used. The particle is porous due to the permanent pores uniformly formed throughout the particle. The permanent pores having a pore size of from 2 to 800 nm, preferably from 2 to 100 nm, are uniformly formed.

The particle size in the present invention is measured by a method using Coulter counter.

The permanent pore means a rigid pore which might be present even when the gel of the copolymer is in a state of dryness. However, a size of the permanent pore in the state of dryness may be slightly different from one in a wet state.

The size of the permanent pore in the present invention is measured by the method described in *Angw. Chem. Int. Ed. Egl.*, 17, 901–908 (1978).

As one method for rendering a synthetic polymer particle porous, a particle having a low crosslinking degree on the order of from 1 to 8 wt % based on total amounts of monomers may be used together with a solvent having strong affinity for the particle. In this case, the particle substrate swells and the voids generated by the swelling work out to swelled pores, as a result, the particle becomes porous. However, this method is disadvantageous in that depending on the degree of affinity of the solvent, the porosity varies and in the dry state after removing the solvent, the particle returns to be nonporous. Unlike such a porous particle, the porous copolymer particle of the present invention has permanent pores uniformly formed on the entire of the particle.

A preparation process of a porous copolymer particle according to the present invention is described below. In the preparation process of the present invention, monomers containing from 5 to 60 wt %, preferably from 10 to 40 wt %, of a monomer (A) and from 40 to 95 wt %, preferably from 60 to 90 wt %, of a monomer (B) are dissolved in a diluent in which these monomers are soluble but in which the polymer produced is not soluble, the resulting monomer solution is suspended in an aqueous medium containing a dispersion stabilizer, the monomers are polymerized in the presence of a polymerization initiator, and if desired, the copolymer obtained is modified, thereby producing a porous copolymer particle.

By mixing a diluent with monomers and then copolymerizing the monomers, permanent pores for rendering the particle porous can be formed irrespective of the presence or absence of the solvent for swelling the particle substrate. In this case, the diluent acts as a permanent pore-forming agent and is used for rendering the copolymer particle porous by forming permanent pores. As the diluent, any organic solvent may be used as long as it dissolves the monomers, is inactive to the polymerization reaction and does not dissolve the polymer.

Examples of such a diluent include aromatic hydrocarbons such as toluene, xylene and diethylbenzene; saturated aliphatic hydrocarbons such as hexane, heptane, octane and decane; alcohols such as isoamyl alcohol, hexyl alcohol and octyl alcohol; aliphatic halogenated hydrocarbons such as dichloromethane, dichloroethane and trichloroethane; and aliphatic or aromatic esters such as ethyl acetate, butyl acetate, dimethyl phthalate and diethyl phthalate. The amount of the organic solvent added as a diluent is preferably from 30 to 300 wt % based on the total weight of monomers.

The copolymer particle of the present invention is prepared by suspension polymerization in an aqueous medium containing an appropriate dispersion stabilizer. In this case, the polymerization initiator used is not particularly limited and a known radical polymerization initiator capable of generating free radicals may be used. Examples thereof are an azo-type initiator such as 2,2'-azobis-iso-butyronitrile and 2,2'-azobis(2,4-dimethylvaleronitrile), peroxides such as t-butyl peroxide, t-amyl peroxide and cumyl peroxide, organic peracids such as benzoyl peroxide, acetyl peroxide and propionyl peroxide or the like. Concentration of the polymerization initiator is not particularly limited but is preferably from 0.01 to 5 wt % based on the monomers.

For the polymerization reaction, a suspension polymerization method may be used where a monomer solution is suspension polymerized while stirring in an aqueous medium containing an appropriate dispersion stabilizer. The dispersion stabilizer used may be a known one. Usually, a water-soluble polymer compound such as gelatin, sodium polyacrylate, polyvinyl alcohol, hydroxyethyl cellulose, carboxymethyl cellulose or the like is used as the dispersion stabilizer. The concentration of the dispersion stabilizer is preferably from 0.1 to 5 wt % based on the aqueous medium. The water medium is a medium mainly comprising water but water-soluble components such as salts may be dissolved therein in addition to water.

In order to prevent dissolution of monomers into the aqueous medium, the polymerization reaction is preferably performed by dissolving a salt in the aqueous medium. Examples of the salts which can be used include sodium chloride, calcium chloride and sodium sulfate. An N-vinylcarboxylic acid amide, particularly N-vinylformamide, N-vinylacetamide, N-vinylpropionamide or the like has high solubility in water, therefore, in order to prevent dissolution, a salt is preferably used in a high concentration. The salt used and the concentration thereof are not particularly limited, however, the solubility varies depending on the salt used. Therefore, for example, sodium chloride is preferably used by dissolving it to have a concentration of from 0.1 to 15 wt % based on the aqueous medium and calcium chloride to have a concentration of from 1 to 40 wt % based on the aqueous medium.

An aqueous dispersion medium phase contains a dispersion stabilizer and a salt, and an organic solvent phase contains a monomer comprising the monomer (A) and the monomer (B) mixed with a diluent, and a polymerization initiator dissolved therein. If the weight ratio (liquid ratio) of the aqueous dispersion medium phase to the organic solvent phase is too large, N-vinylcarboxylic acid amide is distributed to the aqueous dispersion phase because of its high solubility in water and therefore the yield decreases. If the liquid ratio is too small, the suspended dispersion of the organic solvent phase becomes unstable. Accordingly, the liquid ratio of the aqueous dispersion medium phase to the organic solvent phase is preferably from 2:1 to 10:1 (by weight).

The polymerization reaction is performed preferably under heating at from 40 to 100° C. The suitable pressure of the reaction is approximately atmospheric pressure. The reaction is usually performed for from 5 to 16 hours while stirring after nitrogen purging. By the stirring, the organic solvent phase forms spherical particles to disperse in an aqueous medium, thus allowing the reaction to proceed. At this time, the polymerization proceeds at the particles in the state where a diluent is present, and the polymer grows like a net. When the diluent is removed afterward, a large number of permanent pores are uniformly formed and porous particles can be obtained.

The particles after reaction can be easily separated by filtration or the like. Also, the diluent can be easily removed by heating, drying or the like. The thus-obtained porous copolymer particle is porous, and it is a randomly polymerized polymer having a structural unit derived from the monomer (A) and a structural unit derived from the monomer (B), in which a cross-linked structure is provided owing to the polymerization of a crosslinking monomer in the monomer (B). This porous copolymer particle may be used as it is and also may be used as a modified particle. The modification may be performed, for example, by bonding a functional group thereto. For example, it is possible to give dipole ionic property to a porous copolymer particle by hydrolyzing an amido bond in the structural unit derived from a monomer (A) under a strong acid or base, and thereafter rendering one of the thus-obtained amino group or carboxyl group inactive to form exchangeability with cation or anion.

The porous copolymer particle of the present invention is applicable to absorbent, packing material or the like. The porous copolymer particle may be used depending on the properties thereof for uses such as packing material for solid state extraction or chromatography, high-performance ion exchange resin, electrophotographic toner, liquid crystal display board gap adjusting agent, supporter for immunodiagnosis, drug delivery supporter, cosmetic and filler for coating.

By filling the packing material of the present invention in a reservoir, a cartridge column for solid phase extraction can be manufactured. The constructive material and shape of the reservoir are not particularly limited and they may be sufficient if the reservoir is insoluble in an organic solvent and does not allow the packing material to leak out during the extraction or concentration operation of sample. Examples of the reservoir include an injection cylinder-type syringe formed of polypropylene, polyethylene or the like, having a volume of from 1 to 500 ml, preferably from 2 to 100 ml, and furnished with a resin-made filter. The amount of the packing material filled in the reservoir is appropriately determined according to the bulk density of particles and the amount of the sample concentrated. For example, in the case of the reservoir having a volume of 6 ml, the amount of the packing material filled is preferably from 100 to 2,000 mg, more preferably from 300 to 1,000 mg.

By filling the packing material of the present invention in an appropriate empty column, a column for liquid chromatography may be manufactured. The constructive material and shape of the empty column are not particularly limited and they may be sufficient if the empty column is insoluble in an organic solvent and does not allow the packing material to leak out during the operation of liquid chromatography. Examples of the column include a cylindrical pipe having an interior diameter of from 2 to 20 mm and a length of from 10 to 300 mm, to which both ends an end fitting comprising a filter and a connection part for pipe arrangement can be connected. The filling is performed by an ordinary method while controlling the amount of the packing material and the filling conditions so as to prevent formation of a clearance at both ends of the column.

EXAMPLES

The present invention is explained in more detail by the following Examples. Unless otherwise indicated, all parts, percents, ratios and the like are by weight.

Examples 1 to 4

To a 300 ml-volume separable flask, 100 g of deionized water was charged under a nitrogen gas atmosphere. Thereafter, a dispersion stabilizer and a salt were dissolved therein at a ratio shown in Table 1. Separately, 20 g of monomers were mixed at the ratio shown in Table 1 below, a diluent was added in the ratio shown in Table 1, and 0.2 g of 2,2'-azobis(2,4-dimethylvaleronitrile) as a polymerization initiator was dissolved therein. The resulting solution was charged in the separable flask, the separable flask was placed in a water bath, and the contents were reacted while stirring at 150 rpm by raising the temperature to 60° C. for 6 hours. After cooling, the polymer produced was separated by filtration using a No. 101 filter. The copolymer particle produced was observed through a microscope and found to be spherical. Also, the particle size was measured and the results obtained are shown in Table 1.

TABLE 1

| Example | Monomer (weight ratio) | Diluent | Dispersion Stabilizer | Salt | Particle Size | Permanent Pore Size |
|---|---|---|---|---|---|---|
| 1 | NVA/DVB = 15/85 | DBP = 100% | PVA = 1% | NaCl = 4% | 5–120 μm | 11.2 nm |
| 2 | NVA/EGDM = 15/85 | DBP = 100% | PVA = 1% | NaCl = 4% | 5–120 μm | 14.8 nm |
| 3 | NVA/DVB = 30/70 | DBP = 100% | PVA = 1% | $CaCl_2$ = 30% | 5–120 μm | 10.5 nm |
| 4 | NVA/DVB/EGDM = 10/25/65 | DBP = 120% | PVA = 1% | $CaCl_2$ = 30% | 5–120 μm | 12.3 nm |

In Table 1,
NVA: N-vinylacetamide,
DVB: divinylbenzene,
EGDM: ethylene glycol dimethacrylate,
DBP: dibutyl phthalate, and
PVA: polyvinyl alcohol.

The "%" is "% by weight (wt %)", in the case of the diluent, based on the monomer and in the case of the dispersion stabilizer and salt, based on the deionized water.

The copolymer particles produced were separated by filtration, washed in sequence with hot water and acetone, and after removing the dispersion stabilizer, salts and diluent, dried. The copolymer particles obtained were adjusted to a particle size of from 30 to 60 μm using MINI CLASSIFIER manufactured by Nippon Pneumatic MFG.

The copolymer particles having the adjusted particle size were packed in a stainless steel column having an interior diameter of 4.6 mm and a length of 15 cm for liquid chromatography. Standard polystyrene having an average molecular weight of 2,400,000, 1,070,000, 460,000, 156,000, 66,000, 28,500, 11,600, 7,000, 5,050, 3,250, 2,450, 1,680, 1,320, 980 or 580, produced by Showa Denko K.K., or benzene was injected into this column and the elution time was measured under such conditions that the moving phase was tetrahydrofuran, the flow rate was 0.33 ml/min and the detection and measurement wavelength was 254 nm.

The average permanent pore size was determined from each elution time according to the method described in Istvan Halasz, Kornel Martin, *Angew. Chem. Int. Ed. Egl.*, 17, 901–908 (1978) and the results obtained are shown in Table 1.

Example 5

In a mixed solution containing 825 g of divinylbenzene having a purity of 80 wt % (DVB-H, produced by Sankyo Kasei K.K.), 375 g of ethylene glycol dimethacrylate, 1,230 g of toluene and 270 g of 2-ethylhexanol, 300 g of pulverized N-vinylacetamide (produced by Showa Denko K.K.) was dissolved and subsequently 40 g of 2,2'-azobis(2,4-dimethylvaleronitrile) was dissolved to prepare an organic solvent phase ("oil phase").

Separately, an aqueous solution (water: 6 l) containing 2,700 g of calcium chloride and 360 g of sodium chloride was slowly stirred and thereto an aqueous solution (water: 3 l) containing 90 g of polyvinyl alcohol (Kuraray™ Poval PVA-224, produced by Kuraray K.K.) and 0.2 g of sodium nitride was added little by little to prepare an aqueous medium phase ("aqueous phase")

The oil phase and the aqueous phase prepared above were mixed in a 20 l-volume stainless steel-made vessel, and the mixture was stirred at 400 rpm for 40 minutes using a stirring device with a stirring blade for formation of fine particles. Thereafter, the stirring blade was exchanged with a stirring blade for ordinary stirring and while stirring at 150 rpm, the reaction was allowed to proceed at 70° C. for 6 hours. Crosslinked copolymer particles produced were collected by filtration, washed with 90 l of warm water at 70° C. and then with 15 l of acetone, spread on a stainless-steel vat to undergo air drying, and further dried at 70° C. for 24 hours under reduced pressure. The particles obtained were classified into from 20 to 40 µm using a pneumatic classifier to obtain a packing material for solid phase extraction.

In a cartridge for solid phase extraction furnished with a polyethylene-made filter at the bottom, 500 mg of the packing material obtained above was filled and another polyethylene-made filter was put in the top, thereby obtaining a cartridge column for solid phase extraction.

This cartridge column for solid phase extraction was measured on the reagent recovery in the wet state or dry state through the following procedure.

Measurement of Recovery in Wet State
(1) The cartridge column for solid phase extraction was set in a suction manifold;
(2) 5 ml of methanol was passed through the column at 5 ml/min;
(3) 5 ml of water was passed through the column at 5 ml/min;
(4) 5 ml of a sample solution obtained by dissolving the sample in a 20 mM phosphoric acid buffer solution (pH: 7) to have a concentration of 10 µg/ml was passed through the column at 5 ml/min;
(5) 5 ml of a 20 mM phosphoric acid buffer solution (pH: 7) was passed through the column at 5 ml/min;
(6) 5 ml of methanol was passed through the column at 5 ml/min and the eluate was recovered;
(7) an internal standard substance was added to the eluate recovered and 20 µl of the mixture was analyzed by HPLC to determined the quantity of sample contained in the eluate; and
(8) a percentage of the value determined in (7) to the initial value (sample concentration×5 ml) was obtained and defined as the recovery.

Measurement of Recovery in Dry State
(1) The cartridge column for solid phase extraction was set in a suction manifold;
(2) 5 ml of methanol was passed through the column at 5 ml/min;
(3) after the methanol reached the upper end of the packing material, the packing material was dried for 10 minutes while keeping the decompression degree at 10 mmHg;
(4) 5 ml of a sample solution obtained by dissolving the sample in a 20 mM phosphoric acid buffer solution (pH: 7) to have a concentration of 10 µg/ml was passed through the column at 5 ml/min;
(5) 5 ml of a 20 mM phosphoric acid buffer solution (pH: 7) was passed through the column at 5 ml/min;
(6) 5 ml of methanol was passed through the column at 5 ml/min and the eluate was recovered;
(7) an internal standard substance was added to the eluate recovered and 20 µl of the mixture was analyzed by HPLC to determined the quantity of sample contained in the eluate; and
(8) a percentage of the value determined in (7) to the initial value (sample concentration×5 ml) was obtained and defined as the recovery.

Comparative Example 1

Synthesis, filling and measurement of recovery were performed in the same manner as in Example 5 except for using 825 g of divinylbenzene having a purity of 80 wt % and 675 g of ethylene glycol dimethacrylate in place of 825 g of divinylbenzene having a purity of 80 wt % (DVB-H, produced by Sankyo Kasei K.K.), 375 g of ethylene glycol dimethacrylate and 300 g of pulverized N-vinylacetamide (produced by Showa Denko K.K.) for monomers. The results are shown in Table 2. As compared with Example 5, the recovery in the wet state was slightly lower but the recovery in the dry state was outstandingly lower.

TABLE 2

| | Recovery (%) | | | |
| | Example 5 | | Comparative Example 1 | |
| Compound | dry | wet | dry | wet |
| --- | --- | --- | --- | --- |
| Acetaminophenone | 99.7 | 92.0 | 93.8 | 3.2 |
| ASHRAM | 96.5 | 95.4 | 89.3 | 5.4 |
| Caffeine | 98.3 | 93.5 | 91.0 | 25.5 |
| p-Cresol | 98.7 | 97.8 | 96.3 | 56.9 |

Example 6

Reaction, filtration, washing and drying were performed in the same manner as in Example 5 except that the mixture of oil phase and solid phase was dispersed by a high-speed dispersing machine (homogenizer) while controlling the rotation number and the dispersing time to adjust the maximum oil droplet size to 5 µm. The particles obtained were classified into an average particle size of 4 µm using a pneumatic classifier to obtain a packing material for liquid chromatography.

This packing material was filled in a stainless steel-made column of 4.6 mm (internal diameter)×150 mm (length) by a slurry method and a hydrophobicity decaying test was performed under the following HPLC measurement conditions. The solvent charged before the initiation of test was acetonitrile:water=5:95 (v/v).

HPLC Measurement Conditions
Moving phase: water
Flow velocity: 1.0 ml/min
Detection: UV, 254 nm Temperature: 40° C.
Sample: thymine Assuming that the holding time 1 hour after the passing is t0 and the holding time 35 hours after the passing was t, t/t0=0.98.

It is considered that since the swelled pore is somewhat hydrophilic, acetonitrile in the pore was swiftly displaced with water and the size of the swelled pore was not changed. As a result, the pore surface area participating in the hydrophobic adsorption seems to be kept constant at all times.

Comparative Example 2

Reaction, filtration, washing and drying were performed in the same manner as in Comparative Example 1 except that the mixture of oil phase and solid phase was dispersed by a high-speed dispersing machine (homogenizer) while controlling the rotation number and the dispersing time to adjust the maximum oil droplet size to 5 μm. The particles obtained were classified into an average particle size of 4 μm using a pneumatic classifier to obtain a packing material for liquid chromatography.

This packing material was filled in a stainless steel-made column of 4.6 mm (internal diameter)×150 mm (length) by a slurry method and a hydrophobicity decaying test was performed by the same method as in Example 6.

Assuming that the holding time 1 hour after the passing is t0 and the holding time 35 hours after the passing was t, t/t0=0.23.

It is considered that since the swelled pore is substantially hydrophobic, acetonitrile in the pore was difficultly displaced with water and when the acetonitrile concentration was reduced lower than the limit, decay (withering) of swelled pore occurred. As a result, the pore surface area participating in the hydrophobic adsorption seems to be reduced with the passing of time.

The porous copolymer particle of the present invention has a porous structure and has structural units derived from a monomer (A) and a monomer (B), therefore, the porous copolymer particle has both hydrophilic properties and hydrophobic properties, and thereby exhibits composite performance. The particle is porous, has excellent mechanical strength, is suitable for use in the particulate state, and can be used for general purposes.

According to the production process of porous copolymer particles of the present invention, a monomer (A) and a monomer (B) are dissolved in a diluent and suspension-polymerized in an aqueous medium, therefore, the above-described porous copolymer particle can be efficiently produced.

The copolymer particle of the present invention can be modified by chemical reaction into a reactive particle having on the surface thereof a vinyl amine unit, therefore, the copolymer particle can be allowed to support various functional substances and used as a highly functional particle.

While the invention has been described in detail and with reference to specific embodiments thereof, it will be apparent to one skilled in the art that various changes and modifications can be made therein without departing from the spirit and scope thereof.

What is claimed is:

1. A porous copolymer particle comprising a particle of a copolymer comprising (i) from 5 to 50 wt % of a structural unit derived from a monomer (A) selected from N-vinylcarboxylic acid amide represented by formula (I):

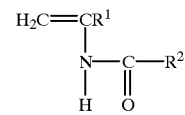

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 50 to 95 wt % of a structural unit derived from a copolymerizable monomer (B) which contains from 55 to 95 wt % of a crosslinking monomer based on the total weight of (A) and (B), or a particle of a modified product of the copolymer, and the particle having a particle size of from 0.1 to 2,000 μm, the particle being prepared by suspension polymerization in an aqueous medium containing a dispersion stabilizer.

2. The porous copolymer particle as claimed in claim 1, wherein the copolymer comprises (i) from 5 to 50 wt % of the structural unit derived from the monomer (A) and (ii) from 50 to 95 wt % of the structural unit derived from the monomer (B).

3. The porous copolymer particle as claimed in claim 1, wherein $R^2$ in formula (I) represents a hydrogen atom, a methyl group or an ethyl group.

4. The porous copolymer particle as claimed in claim 1, wherein the monomer (A) is N-vinylacetamide.

5. The porous copolymer particle as claimed in claim 1, wherein the particle size is from 3 to 500 μm.

6. The porous copolymer particle as claimed in claim 1, wherein the copolymer particle has a permanent pore having a pore size of from 2 to 800 nm.

7. The porous copolymer particle as claimed in claim 3, wherein the copolymer particle has a permanent pore having a pore size of from 2 to 800 nm.

8. The porous copolymer particle as claimed in claim 4, wherein the copolymer particle has a permanent pore having a pore size of from 2 to 800 nm.

9. The porous copolymer particle as claimed in claim 1, wherein the copolymer particle has a permanent pore having a pore size of from 2 to 100 nm.

10. A process for producing a porous copolymer particle comprising dissolving a monomer containing (i) from 5 to 60 wt % of a structural unit derived from a monomer (A) selected from N-vinylcarboxylic acid amide represented by formula (I):

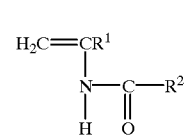

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group, (ii) from 40 to 95 wt % of a structural unit derived from a copolymerizable monomer (B) which contains a crosslinking monomer, in a diluent in which these monomers are soluble but in which the polymer produced is not soluble;

suspending the resulting monomer solution in an aqueous medium containing a dispersion stabilizer;

polymerizing the monomers in the presence of a polymerization initiator; and if desired, modifying the copolymer obtained.

11. The process as claimed in claim 10, wherein $R^2$ in formula (I) represents a hydrogen atom, a methyl group or an ethyl group.

12. The process as claimed in claim 10, wherein the monomer (A) is N-vinylacetamide.

13. The process as claimed in claim 10, wherein the aqueous medium contains a salt.

14. The process as claimed in claim 11, wherein the aqueous medium contains a salt.

15. The process as claimed in claim 12, wherein the aqueous medium contains a salt.

16. An absorbent comprising a porous copolymer particle comprising a particle of a copolymer comprising (i) from 5 to 50 wt % of a structural unit derived from a monomer (A) selected from N-vinylcarboxylic acid amide represented by formula (I):

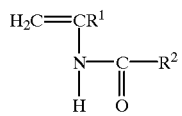

(I)

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 50 to 95 wt % of a structural unit derived from a copolymerizable monomer (B) which contains from 55 to 95 wt % of a crosslinking monomer based on the total weight of (A) and (B), or a particle of a modified product of the copolymer, and the particle having a particle size of from 0.1 to 2,000 μm, the particle being prepared by suspension polymerization in an aqueous medium containing a dispersion stabilizer.

17. The absorbent as claimed in claim 16, wherein $R^2$ in formula (I) represents a hydrogen atom, a methyl group or an ethyl group.

18. The absorbent as claimed in claim 16, wherein the monomer (A) is N-vinylacetamide.

19. A packing material for the solid phase extraction or chromatography, comprising a porous copolymer particle comprising a particle of a copolymer comprising (i) from 5 to 50 wt % of a structural unit derived from a monomer (A) selected from N-vinylcarboxylic acid amide represented by formula (I):

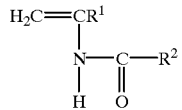

(I)

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 50 to 95 wt % of a structural unit derived from a copolymerizable monomer (B) which contains from 55 to 95 wt % of a crosslinking monomer based on the total weight of (A) and (B), or a particle of a modified product of the copolymer, and the particle having a particle size of from 0.1 to 2,000 μm, the particle being prepared by suspension polymerization in an aqueous medium containing a dispersion stabilizer.

20. The packing material as claimed in claim 19, wherein $R^2$ in formula (I) represents a hydrogen atom, a methyl group or an ethyl group.

21. The packing material as claimed in claim 19, wherein the monomer (A) is N-vinylacetamide.

22. A solid phase extraction cartridge comprising a monolayer containing a porous copolymer particle comprising a porous copolymer particle comprising a particle of a copolymer comprising (i) from 5 to 50 wt % of a structural unit derived from a monomer (A) selected from N-vinylcarboxylic acid amide represented by formula (I):

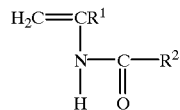

(I)

wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 50 to 95 wt % of a structural unit derived from a copolymerizable monomer (B) which contains from 55 to 95 wt % of a crosslinking monomer based on the total weight of (A) and (B), or a particle of a modified product of the copolymer, and the particle having a particle size of from 0.1 to 2,000 μm, the particle being prepared by suspension polymerization in an aqueous medium containing a dispersion stabilizer.

23. An open-ended container for chromatography in which is packed a porous copolymer particle comprising a porous copolymer particle comprising a particle of a copolymer comprising (i) from 5 to 50 wt % of a structural unit derived from a monomer (A) selected from N-vinylcarboxylic acid amide represented by formula (I):

(I)

$H_2C=CR^1$
|
N—C—$R^2$
| ||
H  O wherein $R^1$ represents a hydrogen atom or a methyl group, and $R^2$ represents a hydrogen atom, a $C_1$–$C_8$ alkyl group, a phenyl group or a phenyl group substituted with a methyl group or an ethyl group and (ii) from 50 to 95 wt % of a structural unit derived from a copolymerizable monomer (B) which contains from 55 to 95 wt % of a crosslinking monomer based on the total weight of (A) and (B), or a particle of a modified product of the copolymer, and the particle having a particle size of from 0.1 to 2,000 μm, the particle being prepared by suspension polymerization in an aqueous medium containing a dispersion stabilizer.

* * * * *